US008113238B2

(12) United States Patent
Poulter

(10) Patent No.: US 8,113,238 B2
(45) Date of Patent: Feb. 14, 2012

(54) PUMPING SYSTEM WITH MANIFOLD VENT

(75) Inventor: Trevor John Poulter, Leeds (GB)

(73) Assignee: Mechtronic Ltd. (GB)

( * ) Notice: Subject to any disclaimer, the term of this patent is extended or adjusted under 35 U.S.C. 154(b) by 659 days.

(21) Appl. No.: 12/097,451

(22) PCT Filed: Dec. 14, 2006

(86) PCT No.: PCT/GB2006/004700
§ 371 (c)(1), (2), (4) Date: Jun. 13, 2008

(87) PCT Pub. No.: WO2007/068942
PCT Pub. Date: Jun. 21, 2007

(65) Prior Publication Data

US 2008/0264500 A1 Oct. 30, 2008

(30) Foreign Application Priority Data

Dec. 16, 2005 (GB) .................................. 0525633.4

(51) Int. Cl.
*B01D 19/00* (2006.01)

(52) U.S. Cl. ........... 137/583; 137/587; 137/589; 55/417

(58) Field of Classification Search .................. 137/583, 137/587, 589; 55/417
See application file for complete search history.

(56) References Cited

U.S. PATENT DOCUMENTS

| | | | |
|---|---|---|---|
| 2,992,757 A | 7/1961 | Richards | |
| 3,057,518 A | 10/1962 | Japp | |
| 5,370,269 A * | 12/1994 | Bernosky et al. | 222/61 |

FOREIGN PATENT DOCUMENTS

| | | |
|---|---|---|
| DE | 1 235 760 | 3/1967 |
| GB | 2 120 208 A | 11/1983 |
| GB | 2 318 529 A | 4/1998 |

OTHER PUBLICATIONS

United Kingdom Search Report dated Apr. 19, 2006, for Great Britain Application No. GB 05 25 633.4, 3 pgs.

United Kingdom Examination Report dated Jan. 8, 2009, for Great Britain Application No. GB 05 25 633.4, 4 pgs.

Notification of Transmittal of the International Search Report and the Written Opinion of the International Searching Authority dated Mar. 21, 2007, for International Application No. PCT/GB2006/004700, 14 pgs.

* cited by examiner

*Primary Examiner* — Kevin Lee
(74) *Attorney, Agent, or Firm* — Shumaker & Sieffert, P.A.

(57) ABSTRACT

A liquid delivery system includes at least one liquid storage tank; a manifold; an integral manifold vent system communicating directly with the manifold and including a manifold vent valve and a manifold vent pipe; a first liquid sensor; and a delivery outlet flow restrictor. The manifold is provided with an inlet and an outlet, the inlet of the manifold being connected to the at least one liquid storage tank; the delivery outlet flow restrictor is located downstream from the manifold; the first sensor is adapted to detect the formation of an air pocket in the manifold; and the integral manifold vent system includes at least one section having an internal diameter small enough to ensure smooth filling of the manifold with the liquid being dispensed when the manifold vent valve is opened to release trapped gas.

24 Claims, 5 Drawing Sheets

PUMPING SYSTEM WITH MANIFOLD VENT

The present invention relates to pumping and dispensing systems. In particular, the present invention relates to an improved manifold for use in a pumping or dispensing system for dispensing liquid, especially but not exclusively for dispensing liquid fuels. Most especially the invention relates to systems for use with road tankers.

It is known to dispense liquid from a storage tank through a delivery system incorporating a metering system and a delivery outlet valve. In many applications it is desirable to pump the liquid through the delivery system using a mechanical pump. In such cases, one or more storage tanks are typically connected to the delivery system via a manifold. The metering system measures the quantity of liquid delivered through the delivery system and displays the quantity by means of a gauge or other suitable display. The delivery outlet valve is located downstream from the metering system.

A road tanker is typically provided with a plurality of on-board storage tanks and a delivery system as described above which is used to deliver liquid to customers, such as fuel to fuel retailers or major fuel consumers such as road vehicle operators, agricultural businesses and so on.

The problem exists that gas may be introduced into the delivery system and passed through the metering system, resulting in an erroneous measurement of the quantity of liquid delivered. In this situation, the metering system will typically indicate that a larger quantity of fuel has been delivered than that which has actually been delivered. Clearly, such a situation is undesirable.

One proposed solution to this problem is to install a gas extraction device downstream from a manifold connected to the storage tank. A gas extraction device according to the prior art typically comprises a plurality of baffles to trap gas and facilitate venting of the gas.

A schematic diagram of a prior art delivery system having such a gas extraction device is shown in FIG. 1. Fuel from a storage tank 250A, 250B, 250C or 250D may be passed through a valve 200A, 200B, 200C or 200D, respectively, and into a manifold 100. A gas extraction device 20 is positioned directly below the manifold 100 and is designed to trap gas entrained in the liquid flow. Gas that is trapped by the gas extraction device 20 must rise back along the pipe connecting the manifold 100 to the gas extraction device, against the flow of liquid through the manifold. Gas that succeeds in doing so forms a gas pocket in an upper portion of the manifold 100.

It is known to provide a pair of liquid sensors, a first sensor 110 being located proximate an inlet of the manifold 100 and a second sensor 115 being located proximate an outlet of the gas extraction device 20. When the first sensor 110 detects an absence of liquid, indicating an accumulation of gas in the manifold 100, a liquid pump downstream from the gas extractor 20 is slowed down and a manifold vent valve 140 is opened to facilitate venting of the gas. As the gas is vented, further liquid flows into the manifold 100 from the storage tank. When the first liquid detector 110 again detects the presence of liquid, the manifold vent valve 140 is closed, and the liquid pump returned to its normal pumping speed.

Furthermore, it is often desirable to dispense more than one type of liquid through the same delivery system. Road tankers are typically equipped with a plurality of storage tanks, and may for example carry diesel oil, fuel oil and kerosene in separate tanks. However, if different liquids are to be dispensed through the same delivery system it is important to avoid cross-contamination between certain liquids. For example it is important to ensure that fuel for which duty has not been paid is not mixed with duty-paid fuel and sold as duty-paid fuel. Substantial fines may be levied in the event of non-compliance with this regulation.

Thus, in situations where for example a second liquid such as a duty-paid fuel is to be dispensed following the dispensing of a first liquid such as a non duty-paid fuel, it is important to ensure that the quantity of second liquid delivered to the customer is not contaminated with first liquid. In addressing this problem, it is customary to close the storage tank outlet of the first liquid and continue to pump first liquid through the system until the second liquid sensor 115 detects an absence of liquid. A quantity of duty-paid fuel is then pumped through the delivery system in order to flush first liquid from the system, before the delivery of duty-paid fuel to the customer is commenced.

SUMMARY

Conventional gas extraction devices have a relatively large internal surface area, and clingage of first liquid from the earlier delivery results in a substantial amount of second liquid being required to be flushed through the delivery system before the level of contamination is sufficiently low to allow delivery to commence. Furthermore, mixing of fuels in the section of pipe downstream from the gas extraction device results in further second liquid being required to be pumped through the system before the contamination level is sufficiently low to allow delivery to commence.

The present invention seeks to provide a liquid delivery system which is capable of alleviating or eliminating at least some of the above described deficiencies of the prior art.

In a first aspect of the present invention there is provided a liquid delivery system comprising:

at least one liquid storage tank;

a manifold;

an integral manifold vent system communicating directly with the manifold and comprising a manifold vent valve and a manifold vent pipe;

a first liquid sensor; and a delivery outlet flow restrictor, wherein the manifold is provided with an inlet and an outlet, the inlet of the manifold being connected to the at least one liquid storage tank;

the delivery outlet flow restrictor is located downstream from the manifold;

the first sensor is adapted to detect the formation of an air pocket in the manifold; and the integral manifold vent system comprises at least one section having an internal diameter small enough to ensure smooth filling of the manifold with the liquid being dispensed when the manifold vent valve is opened to release trapped gas.

The at least one section having an internal diameter small enough to ensure smooth filling may be provided by a manifold vent valve permitting a restricted flow in its open condition. Hence, the manifold vent valve and said section are provided integrally, that is, in or by the same component.

DETAILED DESCRIPTION

The present invention has the advantage that a separate gas extraction device is not required to be installed in the liquid delivery system.

By flow restrictor is meant a valve, a tap, or any other device suitable for restricting the flow of liquid.

The integral vent system is designed to release trapped gas more slowly than prior art systems. The vent system limits the rate at which air may be vented through the manifold vent pipe when the manifold vent valve is opened. This may be achieved by restricting the internal diameter of at least a portion of the integral vent system. This feature reduces the risk that gas that has collected in the upper portion of the manifold re-mixes with liquid flowing into the manifold during the process of venting the gas. The risk of obtaining an erroneous reading of the quantity of liquid dispensed from the system is reduced as a consequence of this feature. In addition, the increase in efficiency of the venting process allows delivery of a given quantity of liquid to be made in a shorter length of time.

A further advantage of the system is the ease with which a first liquid dispensed by the system may be flushed from the system before a second liquid may be dispensed with a sufficiently low level of contamination by the first liquid. This is due at least in part to the fact that a liquid delivery system according to the present invention does not require a separate gas separation device. Gas separation devices typically have a large internal surface area:volume ratio and may require relatively large volumes of a second liquid to be pumped through them before a contamination level of the second liquid by residual first liquid is sufficiently low. For example, in the case of delivery of white diesel (duty paid) following a delivery of red diesel (non duty-paid), a large quantity of white diesel must be pumped through the delivery outlet (and normally into the red diesel tank) before the level of contamination of pumped white diesel has a sufficiently low red diesel content to be acceptable for delivery to the fuel recipient's storage tank. It is essential to avoid contaminating white diesel (duty paid) stored in the fuel recipient's storage tank with red diesel (no duty paid).

Preferably, the manifold is provided with a gas trap, disposed within the manifold, the gas trap being adapted to trap gas entrained in a liquid when a flow of liquid is provided through the manifold.

This feature has the advantage that a separate gas extraction device downstream from the manifold is not required. By locating a gas trap within the manifold, the distance that trapped gas bubbles must travel against the flow of liquid before collecting to form a gas pocket is substantially reduced. This has the advantage of increasing the efficiency of the system in trapping and eliminating entrained gas. Furthermore, the flow rate of liquid through the system may be increased without the risk of trapped gas becoming entrained again in the liquid flow.

Preferably the gas trap comprises a mesh, the mesh having perforations capable of trapping gas bubbles entrained in liquid passing through the mesh.

Preferably, the gas trap is of a frusto-conical shape. More preferably, a wider end of said gas trap is oriented so as to face the manifold liquid outlet.

The gas trap is effective in trapping gas bubbles entrained in the liquid flow. The gas bubbles accumulate in an upper portion of the manifold from which they may be vented through the manifold vent valve.

Preferably a liquid flow-path is provided between the manifold inlet and the manifold outlet around an edge of the gas trap without passing through the gas trap, such that at least a portion of liquid may bypass the gas trap.

Preferably the system further comprises a manifold-air system, the manifold-air system comprising a manifold-air flow restrictor operable to allow air to enter the manifold, the manifold-air system having an internal diameter large enough to ensure the manifold can be filled with air in a timely manner when the manifold-air flow restrictor is opened.

This feature enables the manifold to be filled with air rapidly when it is required to drain the manifold of liquid. Draining of the manifold might be required, for example, when a second liquid is to be dispensed from the system following the dispensing of a first liquid from the system.

Preferably, the manifold-air flow restrictor is a one-way check valve.

Preferably, the manifold comprises a collector pipe portion and a housing portion, the collector pipe having a liquid outlet connected to a liquid inlet of the housing, wherein said at least one storage tank is connected to an inlet of the collector pipe and said manifold outlet is formed in said housing.

Preferably, the first liquid sensor is provided in an upper portion of the housing.

Preferably, the collector pipe is oriented in a substantially horizontal plane.

Preferably, the manifold liquid outlet is below the manifold housing liquid inlet.

By below is meant that the manifold liquid outlet is at a location either directly below the housing liquid inlet, ie in the same vertical plane, or at a location that is below the housing liquid inlet but not in the same vertical plane as the housing liquid inlet.

Preferably, an internal dimension of the manifold housing is larger than an internal dimension of the collector pipe. Still more preferably, a cross-sectional area of the manifold housing in a direction normal to a liquid flow path through said housing is larger than a corresponding cross-sectional-area of the manifold collector pipe.

This feature has the advantage that the speed at which liquid flows through the manifold is reduced in the manifold housing relative to the speed of flow in the collector pipe. This reduction in speed assists in ensuring that gas bubbles are able to rise against the flow of liquid in the housing. If the flow of liquid through the housing is too fast, gas bubbles may become entrained again in the liquid flow.

Preferably, the system further comprises a liquid pump.

Preferably, the system is adapted to pump liquid with said pump operating at a first pumping speed, the system being further adapted to reduce the pumping speed of said pump to a second pumping speed when gas is detected by said first sensor during a pumping operation.

The feature of reducing the pumping speed, rather than stopping pumping altogether, has the advantage of further ensuring a smooth flow of liquid through the system. A smooth flow has been found to reduce the likelihood of the formation of gas bubbles in the liquid before the liquid passes through the metering system.

Preferably, the system further comprises a second sensor, the second sensor being adapted to provide an indication that the manifold is substantially or wholly empty of liquid.

This feature has the advantage of enabling the manifold to be drained of a first liquid before a second liquid is introduced into the manifold.

Preferably, the second sensor is located proximate the manifold outlet.

By proximate is meant that the second sensor may be located immediately above, immediately below or at the manifold outlet.

Alternatively, the second sensor may be located downstream (preferably immediately downstream) from the manifold outlet and below the manifold outlet. This latter feature further reduces the quantity of first liquid remaining in the delivery system before a second liquid is pumped through the system.

More preferably, the second sensor is at a location having a relatively low internal cross-sectional area in a substantially horizontal plane.

This feature has the advantage that the amount of mixing of a first liquid that has been drained to the level of the second sensor, with a second liquid subsequently introduced into the system, may be substantially reduced. This results in a reduction in the amount of second liquid that must be passed through the delivery outlet before the contamination level of the second liquid with first liquid is negligibly low.

Thus, when a first liquid that has been passed through the system is drained to the level of the second sensor, the surface area of the first liquid is relatively small. When a second liquid is then introduced into the system, the area of the interface between the first and second liquids is correspondingly small.

This results in only a limited amount of mixing of the two liquids. When liquid in the delivery system is subsequently pumped from the delivery outlet, a relatively abrupt change in the composition of liquid pumped from the outlet occurs, ie from purely first liquid to purely second liquid.

In the case that the second sensor is located in a section of pipe below the manifold, rather than at the manifold outlet itself, the section of pipe should ideally be of a substantially vertical orientation. If the second sensor is located in a section of pipe that is not of a substantially vertical orientation, such as a substantially horizontal orientation, the interface between the first and second liquids will be relatively large due to the relatively large internal cross-sectional area in a horizontal plane of the delivery system at that location. A substantial degree of mixing of first and second liquids may therefore occur, leading to a relatively broad transition in the composition of liquid flowing from the delivery outlet.

Preferably, the system is adapted to close said delivery outlet flow restrictor when the second sensor detects an absence of liquid.

Preferably, the system comprises more than one storage tank connected to said collector pipe, the system being adapted to feed liquid from a selected one of said more than one storage tank to said manifold inlet.

This has the advantage that different liquids can be supplied using a single delivery system.

Preferably, the system is further provided with a flow metering system.

Preferably, the metering system is located downstream from the manifold outlet.

Preferably a flow path selector is installed downstream from the manifold outlet, the flow path selector having a plurality of selector outlets.

Preferably, each of said selector outlets is connected to a delivery line.

This feature has the advantage that a different delivery line may be employed for different liquids when it is desired to avoid cross-contamination between the liquids.

Preferably, each of said delivery lines comprises a liquid pump.

Preferably, the metering system is connected between the manifold outlet and the flow path selector.

Alternatively a metering system may be connected downstream of each flow selector outlet.

The system may be installed in a road tanker.

In a second aspect of the present invention there is provided a manifold, the manifold comprising at least one liquid inlet port; a liquid outlet port; a manifold-vent outlet port; a manifold-air inlet port; and a first liquid sensor port, wherein with the manifold housing disposed in an upright condition the manifold-vent outlet port is provided in an upper portion of the manifold and the liquid outlet port is provided in a lower portion of the manifold.

Preferably there is further provided a gas trap, disposed within the manifold, the gas trap being adapted to trap gas entrained in a liquid when a flow of liquid is provided through the manifold.

Preferably the gas trap is of a frusto-conical shape.

Preferably a wider end of said gas trap is oriented so as to face the manifold liquid outlet port.

The manifold-vent outlet port and the manifold-air inlet port may be the same port.

In this case, the manifold-vent valve and the manifold-air flow restrictor may be connected to a pipe which connects to the manifold-vent outlet port of the manifold.

In a third aspect of the present invention there is provided a manifold, the manifold comprising at least one liquid inlet port; a liquid outlet port; a manifold-vent outlet port; a first liquid sensor port, and a gas trap, wherein the gas trap is disposed within the manifold, the gas trap being adapted to trap gas entrained in a liquid when a flow of liquid is provided through the manifold, and wherein with the manifold disposed in an upright condition the manifold-vent outlet port is provided in an upper portion of the manifold and the liquid outlet port is provided in a lower portion of the manifold.

Preferably the gas trap is of a frusto-conical shape.

Preferably a wider end of said gas trap is oriented so as to face the manifold liquid outlet port.

Preferably the manifold further comprises a manifold-air inlet port.

The manifold-air inlet port and the manifold-vent outlet port may be the same port.

BRIEF DESCRIPTION OF DRAWINGS

For a better understanding of the present invention, and to show how it may be carried into effect, reference will now be made by way of example to the accompanying drawings, in which.

DETAILED DESCRIPTION OF THE DRAWINGS

Figure 1:
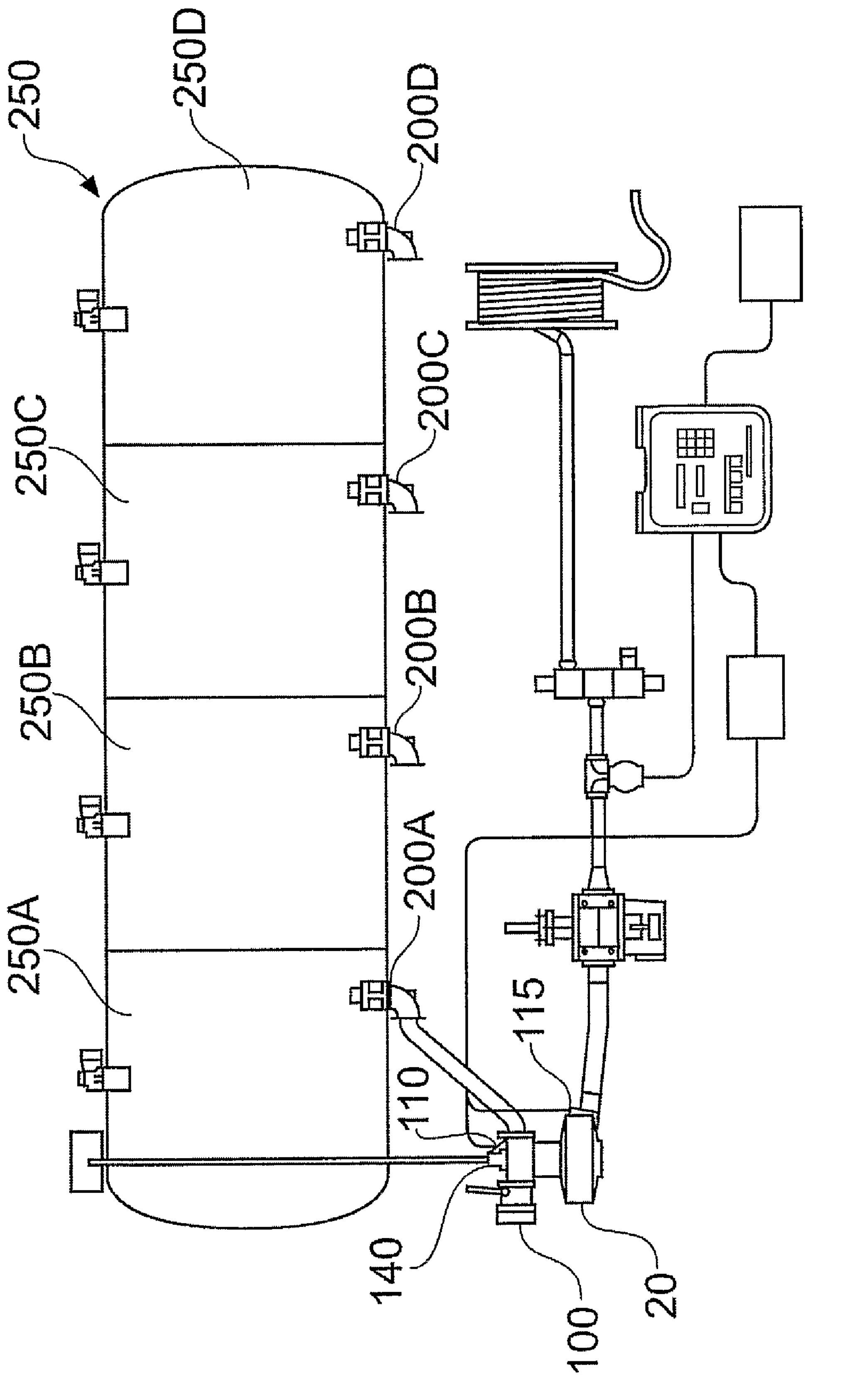
Fig. 1 (PRIOR ART)
FIG. 1 is a schematic diagram of a delivery system according to the prior art having a separate gas extractor.

According to a first embodiment of the invention, a pumping system 10 comprises a manifold 100 having a manifold collector pipe portion 101 connected to a manifold housing portion 102. The housing portion 102 is a chamber having an internal dimension larger than that of the collector pipe portion 101. The cross-sectional area of the housing 102 in a plane normal to the flow of liquid through the housing 102 is larger than the corresponding cross-sectional area of the collector pipe 101. This has the effect of reducing the speed at which liquid passing through the housing 102 flows. This in turn makes it more likely that gas bubbles in liquid passing through the housing will be able to rise against the liquid flow and collect in an upper portion of the housing 102. The housing 102 may be located at one end of the collector pipe 101. Alternatively the housing 102 may be located in the middle of the collector pipe 101, or at any other suitable location of the collector pipe 101.

The manifold is configured such that the collector pipe 101 is oriented in a substantially horizontal orientation with a manifold outlet 130A oriented such that liquid flowing through the manifold outlet 130A from the housing 102 is at a lower level than liquid flowing from the collector pipe 101 into the housing 102. A portion of the housing 102 is above the level of the inlet to the housing from the collector pipe 101 and provides a volume away from the main current of liquid from the collector pipe 101 through the housing 102, in which a gas pocket may form. The risk that gas comprising the gas pocket becomes entrained again in the liquid flow is thereby reduced.

Figure 2:
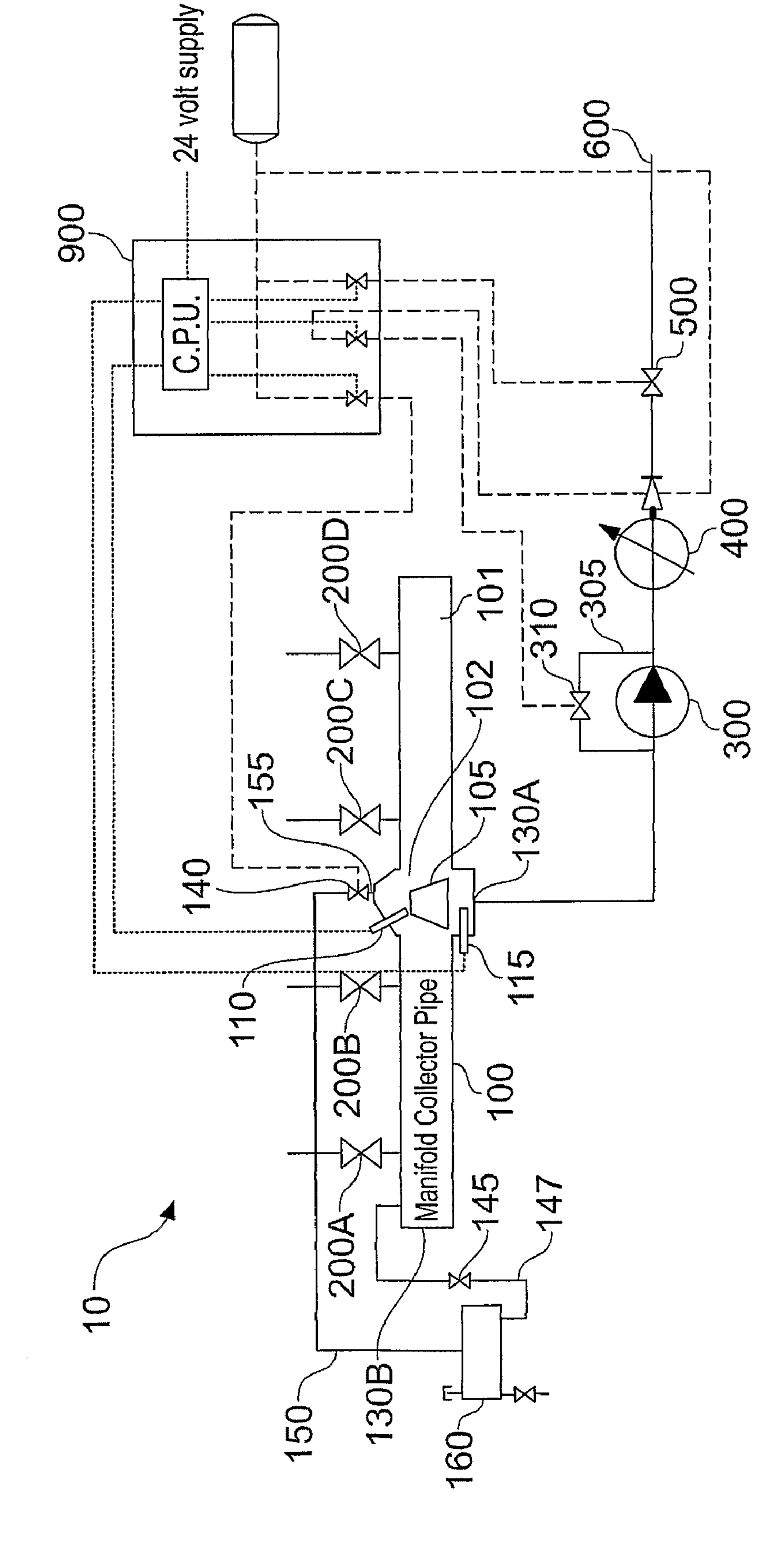
FIG. 2 is a schematic diagram of a delivery system according to a first embodiment of the invention.
Figure 5:
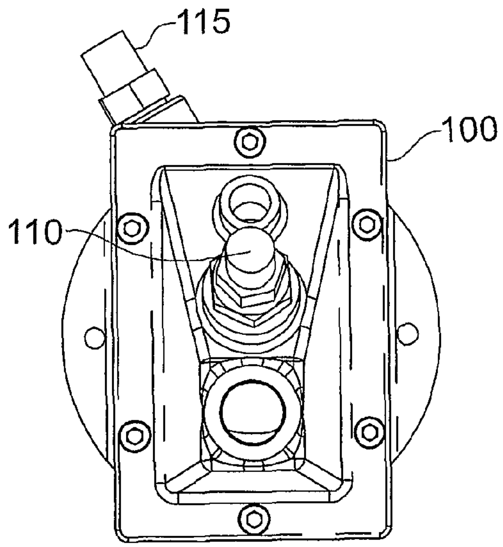
FIG. 5 is a plan view of a manifold according to the first embodiment of the invention.
Figure 4:
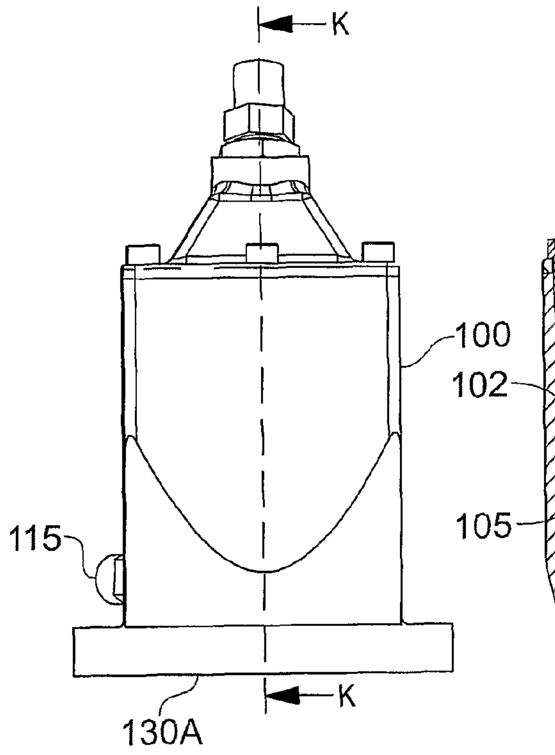
FIG. 4 is a side elevation of a manifold according to the first embodiment of the invention.
Figure 3:
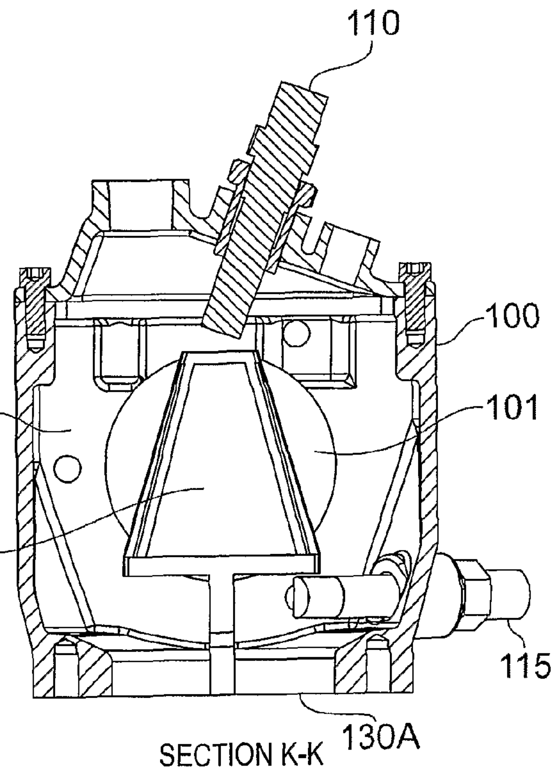
FIG. 3 is cross-sectional schematic diagram of a manifold according to the first embodiment of the invention.

A gas trap 105 in the form of a frusto-conical mesh is provided within the housing 102 as shown in FIG. 2. The gas trap 105 assists in trapping gas bubbles entrained in liquid that passes through the manifold 100. The gas trap 105 is oriented such that the portion of the trap of larger diameter faces towards the manifold outlet 130A.

Liquid flowing from the collector pipe 101 through the housing 102 may flow to the manifold outlet 130A through the perforations in the mesh of the gas trap 105, or it may flow under the gas trap 105 without passing through the mesh.

A series of manifold inlets are formed in the collector pipe 101, each inlet being connected to one of three storage tanks 250A, 250B, 250C via valves 200A, 200B, 200C, respectively. An interlock system is operable to prevent an operator from allowing liquid from more than one tank to be simultaneously fed into the manifold 100. This is important in reducing the risk of cross-contamination of liquids dispensed by the system. In alternative embodiments of the invention a smaller or larger number of storage tanks may be provided.

Optical sensors 110, 115 are fitted to the housing 102 of the manifold to detect a level of liquid in the manifold; a first sensor 110 is positioned in an upper portion of the housing 102 to detect whether the manifold is substantially full of liquid (and that no gas pocket is present), whilst a second sensor 115 is positioned proximate the liquid outlet 130A of the manifold, in a lower portion of the housing 102, to detect whether the manifold 100 is substantially empty of liquid. The second sensor 115 may be located proximate the liquid outlet 130A, eg. just inside, exactly at or just outside the outlet 130A.

A manifold vent system and a manifold-air system are also provided. The manifold vent system comprises a manifold vent valve 140, connected to a manifold vent line 150 which provides a flow path between an upper portion of the housing 102 and a manifold vent tank 160.

The vent tank 160 collects any liquid such as vapour condensate that is exhausted from the manifold 100 when the vent valve 140 is opened. The manifold vent system comprises a section of pipe connecting the manifold 100 and the vent tank 160 having an internal diameter restricted at least locally to approximately 1.5 mm. This restriction is such that it is sufficient to allow a smooth refilling of the manifold with liquid when air is vented from the manifold through the manifold vent system.

The manifold-air inlet system comprises a manifold-air inlet valve 145 connected between the vent tank 160 and the manifold collector pipe 101 via manifold-air inlet line 147. The manifold-air system has an internal diameter sufficient to allow air to pass between the vent tank 160 and the manifold collector pipe 101 quickly and efficiently when air is to be let into the manifold. The vent tank 160 is self-cleaning since the manifold-air line connects to a lower portion of the vent tank 160. Thus, when air is to be let into the manifold via the manifold-air system, any liquid present in the lower portion of the vent tank 160 is drawn into the manifold 100 through the manifold-air system. In practice, the amount of liquid captured by the vent tank 160 is minimal.

In a mode of operation of the delivery system, a displacement pump 300 is employed to draw liquid from one of storage tanks 250A, 250B, 250C into the manifold 100 and out from the manifold via manifold outlet 130A. The liquid subsequently passes through a delivery meter 400 and a delivery outlet flow restrictor 500.

Operation of the system with reference to liquid delivery from a first storage tank 250A and subsequently a second storage tank 250B will now be described in a non-limiting manner. It will be readily understood that the description applies to the delivery of liquid from any one storage tank of the system, followed by delivery from any other storage tank of the system.

During a delivery operation according to this mode of operation, for example from tank 250A, manifold valve 200A and delivery outlet flow restrictor 500 are opened, and displacement pump 300 employed to pump liquid through the delivery system to an outlet 600 of the system via the delivery outlet flow restrictor 500. The outlet 600 may be connected to a hose pipe suitable for filling a receiving tank such as a fuel user's fuel storage tank.

Gas bubbles may be entrained in the liquid being pumped through the manifold 100. The bubbles accumulate in an upper region of the manifold housing. The gas bubbles are captured by the mesh of the gas trap, and tend to coalesce and rise to the top of the manifold housing. When a sufficiently large pocket of gas has accumulated at the top of the manifold housing, the gas pocket is detected by the first liquid sensor 100. This sensor then sends a warning signal to a controller 900.

Upon receiving the warning signal, the controller 900 reduces the rate of pumping of liquid. This may be accomplished by maintaining a pumping speed of pump 300 constant, and opening a non-return check valve 310. As the check valve 310 is operated, a bypass line 305 is opened so that the pump 300 is not stressed.

Manifold vent valve 140 is also opened. Manifold vent line 150 has a portion 155 having an internal diameter or other constriction which limits the rate of flow of gas through the vent line. This provides for a smooth release of trapped gas from the manifold 100 when manifold vent valve 140 is open. In the present embodiment, the portion 155 has a diameter of substantially 0.5 mm to 6 mm. Preferably the diameter is in the range 1 mm to 2 mm. Most preferably the diameter is 1.5 mm. Alternatively the manifold vent line 150 may be of any other design so as to produce a smooth release of gas equivalent to a vent line having a constriction in the range 0.5 mm to 6 mm. For example, a plurality of vent lines may be provided, collectively providing a maximum air through flow rate equivalent to a single vent line of the specified diameter.

As gas is released through the vent line, the manifold re-fills with liquid being dispensed from the storage tank 250A. When the first liquid sensor 110 no longer detects the presence of a gas pocket, the vent valve 140 is closed and the pumping speed of pump 300 is increased to its normal operating speed.

When it is desired to stop the dispensing of a first liquid from the system, and to commence the dispensing of a second liquid, for example from tank 250B, manifold valve 200A is closed, and manifold-air valve 145 is opened. The level of liquid in the manifold 100 is allowed to drop until the second liquid sensor 115 detects that the manifold is substantially (or wholly) empty of liquid. Pump 300 is then stopped and outlet valve 500 is fully closed.

Manifold valve 200B corresponding to storage tank 250B is then opened, and manifold-vent valve 140 opened. The manifold 100 now fills smoothly with second liquid from tank 250B. Once the system detects that the manifold 100 is full of liquid (by reference to liquid sensor 110), manifold-vent valve 140 is closed. The controller 900 then permits outlet valve 500 to be opened, and pump 300 is started. Second liquid is then pumped through the system.

In the event that it is unacceptable to dispense any quantity of the first liquid to a customer when delivery of the second liquid is commenced (ie where contamination of the second liquid delivered to the customer with first liquid must be prevented), first liquid remaining in the system between outlet valve 500 and the second sensor 115 must be flushed from the system before satisfactory delivery of the second liquid can commence.

Flushing of first liquid from the system may be accomplished by pumping second liquid through the system until traces of first liquid can no longer be detected at the delivery outlet 600, e.g. by visual inspection.

Once the flow of first liquid from the outlet 600 or a hose attached to said outlet 600 is no longer detected, delivery of second liquid to a second liquid receiving tank such as the customer's receiving tank may be commenced.

Figure 6:
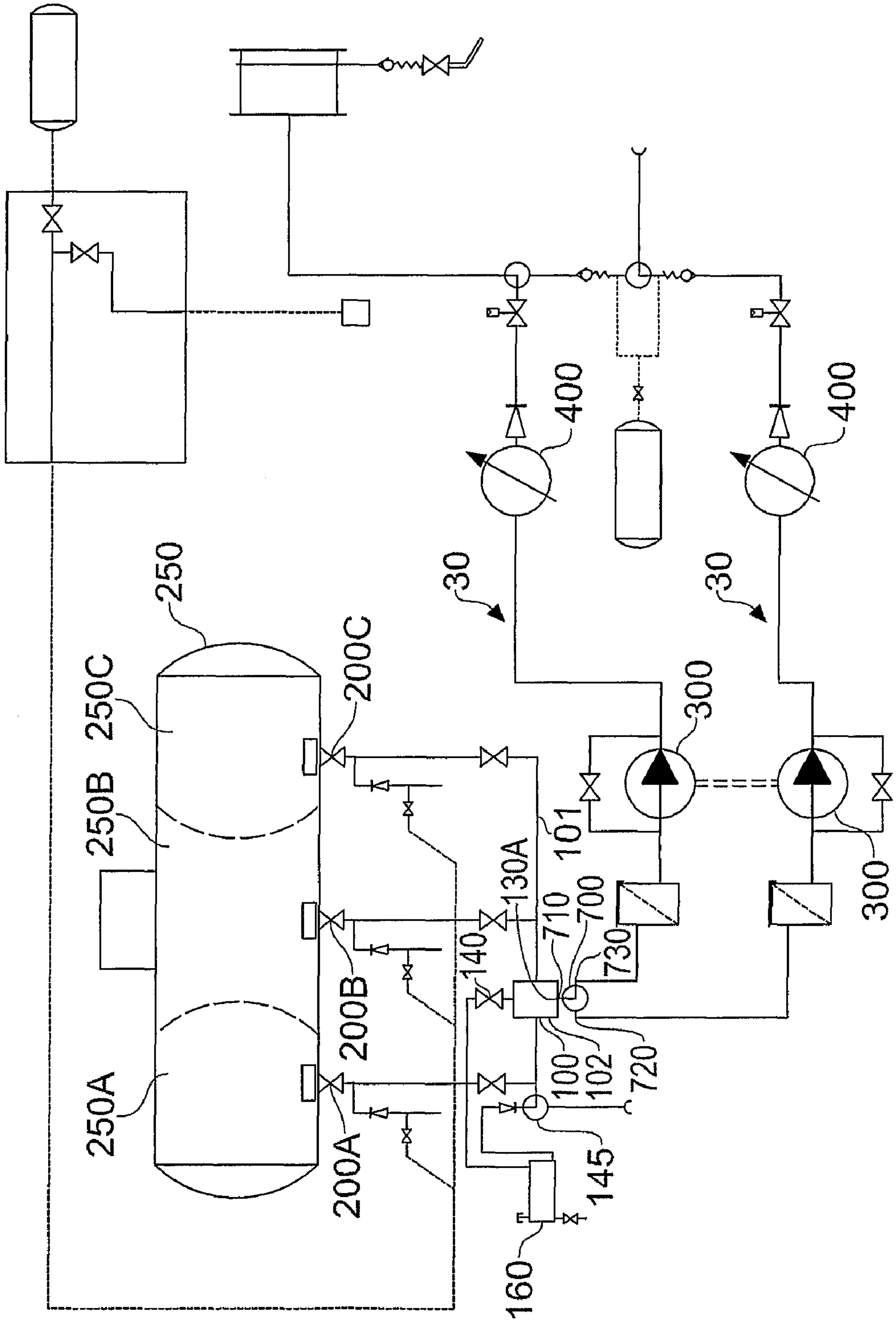
FIG. 6 is a schematic diagram of a pumping system according to a second embodiment of the invention.

According to a second embodiment of the invention (FIG. 6), the manifold outlet 130A is connected to an inlet 710 of a manifold selector valve 700 having two outlets 720, 730. Each outlet 720, 730 is connected to a separate delivery line 30 having a displacement pump 300 and metering system 400. The selector valve may be set to provide a flow path between the selector valve inlet 710 and either of the selector valve outlets 720 and 730. A second sensor may be located downstream of the selector valve 700, in each delivery line 30.

One delivery line 30 would be dedicated to liquid from one tank such as tank 250A, and the other delivery line 30 dedicated to liquid from the other tanks 250B, 250C. Thus, a first liquid from tank 250A may be drained to a location downstream of the selector valve 700 before delivery of a second liquid from tank 250B through the other delivery line 30 is commenced. In this way, contamination of the second liquid flowing to the delivery outlet 600 may be avoided, and the requirement to flush the system before delivery can commence may be substantially eliminated.

In the case where a group of liquids A carried by the tanker can be mixed with one another, and a group of liquids B carried by the tanker may be mixed with one another, but liquids in group A may not be mixed with liquids in group B, one delivery line would be dedicated to liquids in group A and another delivery line dedicated to liquids in group B. Group A or group B might be one liquid only. For example, if red diesel (non duty-paid diesel) is in group A, white diesel (duty-paid) would be in group B.

Figure 7:
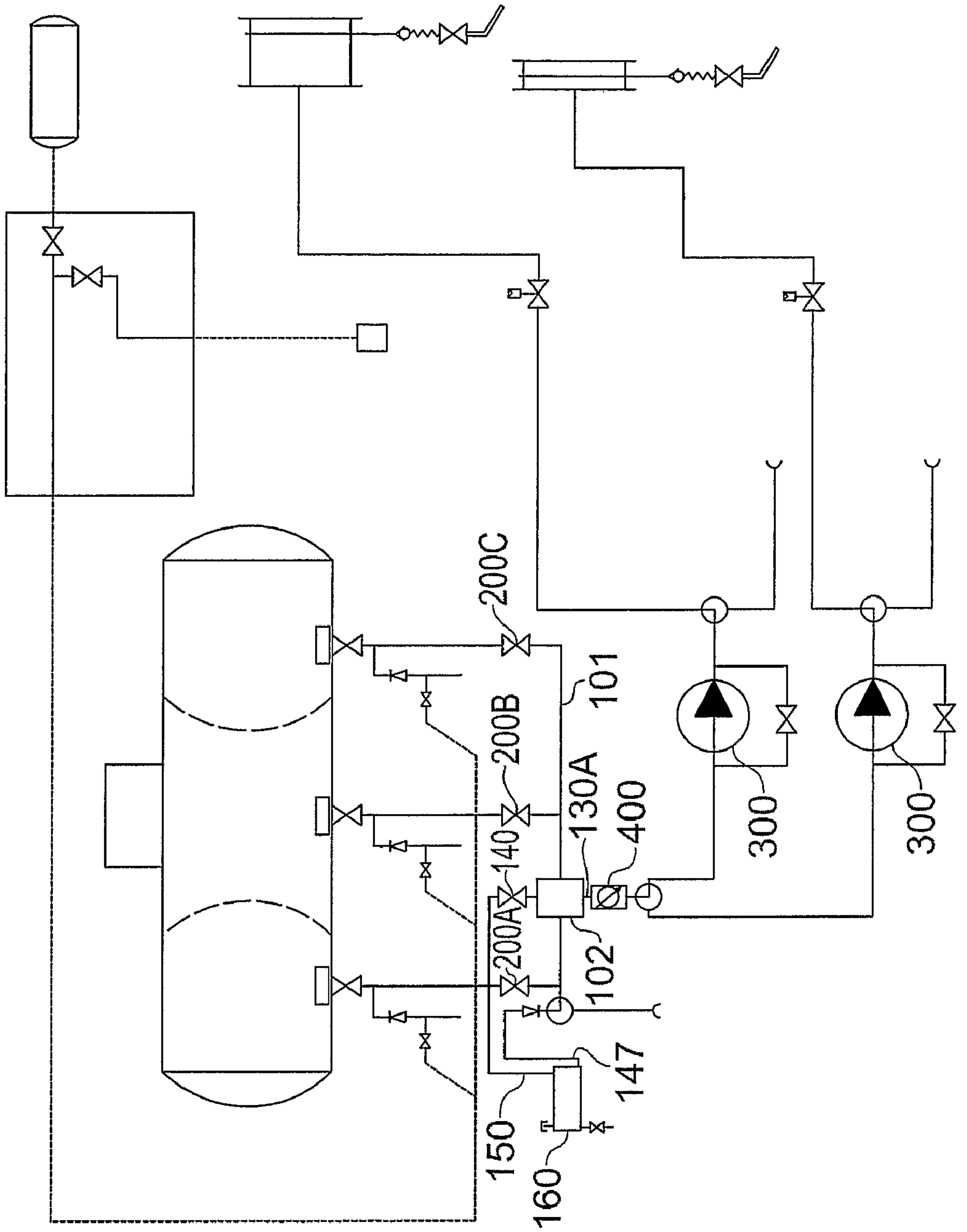
FIG. 7 is a perspective view of a pumping system according to a third embodiment of the invention.

In a third embodiment of the invention (FIG. 7), the metering system 400 of the second embodiment of the invention is located between manifold outlet 130A and manifold selector valve inlet 710. This has the advantage that only one metering system 400 is required. In such applications, a metering system that is drainable is preferred. This reduces the amount of a first liquid that must be flushed through the system when delivery of a second liquid is to take place following the delivery of a quantity of a first liquid. In the present embodiment a turbine metering system is used.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A liquid delivery system comprising:

at least one liquid storage tank;

a manifold;

an integral manifold vent system communicating directly with the manifold and comprising a manifold vent valve and a manifold vent pipe;

a first liquid sensor;

a delivery outlet flow restrictor; and a manifold-air system, the manifold-air system comprising a manifold-air flow restrictor operable to allow air to enter the manifold, when the manifold-air flow restrictor is opened, wherein the manifold is provided with an inlet and an outlet, the inlet of the manifold being connected to the at least one liquid storage tank;

the delivery outlet flow restrictor is located downstream from the manifold;

the first liquid sensor is adapted to detect the formation of an air pocket in the manifold; and the integral manifold vent system is operable to allow filling of the manifold with the liquid being dispensed when the manifold vent valve is opened to release trapped gas.

2. The system of claim 1 wherein the manifold is provided with a gas trap, disposed within the manifold, the gas trap being adapted to trap gas entrained in a liquid when a flow of liquid is provided through the manifold.

3. The system of claim 2 wherein the gas trap comprises a mesh.

4. The system according to claim 2 wherein the gas trap is of a frusto-conical shape.

5. The system according to claim 4 wherein a wider end of said gas trap is oriented so as to face the manifold liquid outlet.

6. The system of claim 1 wherein the manifold-air flow restrictor is a one-way check valve.

7. The system of claim 1 wherein the manifold comprises a collector pipe portion and a housing portion, the collector pipe having a liquid outlet connected to a liquid inlet of the housing, wherein said at least one storage tank is connected to an inlet of the collector pipe and said manifold outlet is formed in said housing.

8. The system of claim 1 wherein the system further comprises a liquid pump, wherein the system is adapted to pump liquid with said pump operating at a first pumping speed, the system being further adapted to reduce the pumping speed of said pump to a second pumping speed when gas is detected by said first liquid sensor during a pumping operation.

9. The system of claim 1 wherein the system further comprises a second sensor, the second sensor being adapted to provide an indication that the manifold is substantially empty of liquid.

10. The system of claim 9 wherein the second sensor is located proximate the manifold outlet.

11. The system of claim 9 wherein the system is adapted to close said delivery outlet flow restrictor when the second sensor detects an absence of liquid.

12. The system of claim 1 wherein the system is provided with a plurality of liquid storage tanks, the system being adapted to feed liquid from a selected tank to said manifold inlet, and wherein a flow path selector is installed downstream from the manifold outlet, the flow path selector having a plurality of selector outlets.

13. The system of claim 12 wherein each of said selector outlets is connected to a delivery line, and wherein each of said delivery lines includes a liquid pump.

14. The system of claim 13 wherein a metering system is connected between the manifold outlet and the flow path selector.

15. The system of claim 12 wherein a metering system is connected downstream of each flow selector outlet.

16. A manifold suitable for use with a delivery system according to claim 1, the manifold comprising:

at least one liquid inlet port;

a liquid outlet port;

a manifold-vent outlet port;

a manifold-air inlet port; and a first liquid sensor port, wherein with the manifold disposed in an upright condition the manifold-vent outlet port is provided in an upper portion of the manifold and the liquid outlet port is provided in a lower portion of the manifold.

17. A manifold according to claim 16 wherein there is further provided a gas trap, disposed within the manifold, the gas trap being adapted to trap gas entrained in a liquid when a flow of liquid is provided through the manifold, and wherein the gas trap is of a frusto-conical shape.

18. A manifold according to claim 17 wherein a wider end of said gas trap is oriented so as to face the manifold liquid outlet port.

19. A manifold suitable for use with a delivery system according to claim 1, the manifold comprising:
at least one liquid inlet port;
a liquid outlet port;
a manifold-vent outlet port;
a first liquid sensor port, and
a gas trap,
wherein the gas trap is disposed within the manifold, the gas trap being adapted to trap gas entrained in a liquid when a flow of liquid is provided through the manifold, and
wherein with the manifold disposed in an upright condition the manifold-vent outlet port is provided in an upper portion of the manifold and the liquid outlet port is provided in a lower portion of the manifold.

20. A manifold according to claim 19 wherein the gas trap is of a frusto-conical shape.

21. A manifold according to claim 20 wherein a wider end of said gas trap is oriented so as to face the manifold liquid outlet port.

22. A liquid delivery system comprising:
at least one liquid storage tank;
a manifold;
an integral manifold vent system communicating directly with the manifold and comprising a manifold vent valve and a manifold vent pipe;
a first liquid sensor; and
a delivery outlet flow restrictor,
wherein the manifold is provided with an inlet and an outlet, the inlet of the manifold being connected to the at least one liquid storage tank;
the delivery outlet flow restrictor is located downstream from the manifold;
the first liquid sensor is adapted to detect the formation of an air pocket in the manifold; and
the integral manifold vent system is operable to allow filling of the manifold with the liquid being dispensed when the manifold vent valve is opened to release trapped gas,
wherein the manifold is provided with a gas trap, disposed within the manifold, the gas trap being adapted to trap gas entrained in a liquid when a flow of liquid is provided through the manifold,
wherein a fluid flow-path is provided between the manifold inlet and the manifold outlet around an edge of the gas trap without passing through the gas trap, such that at least a portion of liquid may bypass the gas trap.

23. A liquid delivery system comprising:
at least one liquid storage tank;
a manifold;
an integral manifold vent system communicating directly with the manifold and comprising a manifold vent valve and a manifold vent pipe;
a first liquid sensor; and
a delivery outlet flow restrictor,
wherein the manifold is provided with an inlet and an outlet, the inlet of the manifold being connected to the at least one liquid storage tank;
the delivery outlet flow restrictor is located downstream from the manifold;
the first liquid sensor is adapted to detect the formation of an air pocket in the manifold; and
the integral manifold vent system is operable to allow filling of the manifold with the liquid being dispensed when the manifold vent valve is opened to release trapped gas,
wherein the manifold comprises a collector pipe portion and a housing portion, the collector pipe having a liquid outlet connected to a liquid inlet of the housing, wherein said at least one storage tank is connected to an inlet of the collector pipe and said manifold outlet is formed in said housing,
wherein the first liquid sensor is provided in an upper portion of the housing.

24. A liquid delivery system comprising:
at least one liquid storage tank;
a manifold;
an integral manifold vent system communicating directly with the manifold and comprising a manifold vent valve and a manifold vent pipe;
a first liquid sensor;
a delivery outlet flow restrictor; and
a second sensor, the second sensor being adapted to provide an indication that the manifold is substantially empty of liquid,
wherein the manifold is provided with an inlet and an outlet, the inlet of the manifold being connected to the at least one liquid storage tank;
the delivery outlet flow restrictor is located downstream from the manifold;
the first liquid sensor is adapted to detect the formation of an air pocket in the manifold; and
the integral manifold vent system is operable to allow filling of the manifold with the liquid being dispensed when the manifold vent valve is opened to release trapped gas,
wherein the second sensor is located downstream from the manifold outlet.

* * * * *